United States Patent
Wu

(10) Patent No.: US 8,853,904 B2
(45) Date of Patent: Oct. 7, 2014

(54) FAN AND MOTOR THEREOF

(75) Inventor: Chih-Hui Wu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 173 days.

(21) Appl. No.: 13/422,520

(22) Filed: Mar. 16, 2012

(65) Prior Publication Data

US 2012/0235526 A1  Sep. 20, 2012

(30) Foreign Application Priority Data

Mar. 18, 2011  (TW) .............................. 100109281 A

(51) Int. Cl.
*H02K 5/16* (2006.01)
*H02K 5/167* (2006.01)

(52) U.S. Cl.
CPC .................................. *H02K 5/1675* (2013.01)
USPC ...... 310/90; 310/67 R; 360/98.07; 360/99.01; 360/99.04; 360/99.08

(58) Field of Classification Search
USPC ......... 310/67 R, 90; 360/98.07, 99.01, 99.04, 360/99.08
See application file for complete search history.

(56) References Cited

U.S. PATENT DOCUMENTS

| | | | |
|---|---|---|---|
| 7,692,892 B2 * | 4/2010 | Xu et al. | 360/99.08 |
| 8,148,862 B2 * | 4/2012 | Shirai et al. | 310/90 |
| 8,264,118 B2 * | 9/2012 | Hong | 310/216.113 |
| 2007/0120433 A1 * | 5/2007 | Sugiyama et al. | 310/90 |
| 2010/0148607 A1 | 6/2010 | Shirai et al. | |

FOREIGN PATENT DOCUMENTS

| | | |
|---|---|---|
| CN | 1638236 A | 7/2005 |
| CN | 1953302 A | 4/2007 |
| CN | 201435637 Y | 3/2010 |
| CN | 101162330 A | 7/2010 |
| JP | 07-036586 | 7/1995 |
| JP | 2007-139185 | 6/2007 |
| TW | 247713 | 10/2004 |
| TW | M315364 | 7/2007 |

* cited by examiner

*Primary Examiner* — Tran Nguyen
*Assistant Examiner* — Leda Pham
(74) *Attorney, Agent, or Firm* — Muncy, Geissler, Olds & Lowe, P.C.

(57) ABSTRACT

A motor includes a base, a bushing, a bearing structure, a stator structure, a rotor structure and a magnetic element. The base has a supporting platform. The bushing is connected with the base. The bearing structure is disposed in the bushing. The bushing is threaded through the stator structure. The rotor structure has a shaft, and the shaft threads through the bearing structure. The magnetic element corresponds to the shaft and is disposed on the supporting platform, and the magnetic element magnetically interacts with the shaft. A fan equipped with the motor is also disclosed.

7 Claims, 8 Drawing Sheets

FAN AND MOTOR THEREOF

CROSS REFERENCE TO RELATED APPLICATIONS

This Non-provisional application claims priority under 35 U.S.C. §119(a) on Patent Application No(s). 100109281 filed in Taiwan, Republic of China on Mar. 18, 2011, the entire contents of which are hereby incorporated by reference.

BACKGROUND OF THE INVENTION

1. Field of Invention

The present invention relates to a fan and a motor thereof. In particular, the present invention relates to a fan and a motor thereof configured with a magnetic element for magnetically attaching to the shaft so as to stable the rotation of the shaft.

2. Related Art

FIG. 1A is a schematic diagram showing a conventional fan 1A and its motor 10. The fan 1A includes a motor 10 and an impeller 40. The motor 10 connects to the impeller 40 for driving it to rotate. The impeller 40 has a hub 41 and a plurality of blades 42. The motor 10 has a rotor 11, a stator 12 and a frame 13. The rotor 11 is connected to the stator 12 through a connecting ring 14. The centers of the magnet 111 of the rotor 11 and the coil 121 of the stator 12 are located at the same level. In other words, the magnetic center A of the magnet 111 and the magnetic center B of the coil 121 are located on the same horizontal plane. Accordingly, when the rotor 11 is rotated, the airflow passing through the rotor 11 applies a reacting force to the rotor 11, so that the rotor 11 vibrates vertically. Accordingly, the shaft 112 of the rotor 11 is moved vertically. This may cause the noise of the fan 1A in the operation, and the abrasion of the connecting ring 14 or other components, thereby shortening the lifetime of the motor 10.

In order to decrease the noise and the abrasion, another fan 1B is disclosed. As shown in FIG. 1B, in the fan 1B, the magnetic center A of the magnet 111 is slightly higher than the magnetic center B of the coil 121. In other words, the center of the magnet 111 is higher than that of the coil 121, so that a vertical gap is formed between the magnetic centers of the magnet 111 and the coil 121. Accordingly, when the rotor 11 is rotated, the magnetic field provided by the coil 121 can not only drive the rotor 11 to rotate, but also apply a force to pull the rotor 11 downwardly, which can eliminate the reacting force that pushes the rotor 11 upwardly.

However, the motor of the fan may be operated in different rotation speeds and environments. For example, the motor may be operated in high rotation speed or upside down. If the motor is upside down, the misaligned configuration for the fan 1B can not provide proper force to pull the rotor 11, which sufficiently restricts the application of the fan 1B. Besides, since some energy is transformed to the reacting force for pushing the rotor 11 upwardly, the rotation speed of the fan 1B can not be efficiently increased.

Therefore, it is an important subject of the invention to provide a fan and a motor thereof that can reduce the noise and vibration so as to decrease the abrasion of the components and improve the application.

SUMMARY OF THE INVENTION

In view of the foregoing, an objective of the present invention is to provide fan and a motor thereof that can operate stably and reduce the noise and vibration so as to decrease the abrasion of the components and improve the application.

To achieve the above objective, the present invention discloses a motor including a base, a bushing, a bearing structure, a stator structure, a rotor structure and a magnetic element. The base has a supporting platform, and the bushing is connected with the base. The bearing structure is disposed in the bushing, and the bushing is threaded through the stator structure. The rotor structure has a shaft, which threads through the bearing structure. The magnetic element corresponds to the shaft and is disposed on the supporting platform, and it magnetically interacts with the shaft.

In one embodiment of the invention, the base is entirely made of a magnetic conductive material, which is, for example but not limited to, a metal (e.g. iron) or an alloy. For example, the base is a metal base. Alternatively, for reducing the weight of the motor, only the supporting platform of the base is made of a magnetic conductive material, and the residual part of the base is made of non-magnetic conductive material such as metal, alloy or rigid plastic.

In one embodiment of the invention, since the supporting platform is made of magnetic conductive material, the magnetic element can attach to the supporting platform. Alternatively, the magnetic element may be disposed on the supporting platform by other mechanisms such as adhering, locking or screwing.

In one embodiment of the invention, the bushing may be made of a plastic material, which is different from the material of the base or the supporting platform, so it can be connected to the supporting platform of the base by insert molding. In this case, the bushing is insert molded with the base, so that the base and the bushing are integrally formed as a single piece, thereby increasing the connection strength between different materials. In addition, the base may include at least one broken hole (a through hole) or a blind hole (not a through hole), and the material of the bushing (e.g. plastic) covers the broken hole or the blind hole. This configuration can increase the contact area between different materials so as to increase the connection strength. To be noted, the broken hole or the blind hole is not limited to a circular hole, and it can be an opening with any regular or irregular shape. Similarly, the material of the bushing can cover the opening and tightly connect to the base.

In one embodiment of the invention, the bearing structure can be a sleeve bearing. In this case, the motor further includes an oil-seal structure disposed in the bushing and located adjacent to the top of the bearing structure. The shaft passes through a through hole of the oil-seal structure. The oil-seal structure can prevent the lubricant of the sleeve bearing from leaking through the top opening of the bushing while the motor is operating, thereby maintaining the lubricating efficiency for the rotating shaft.

In one embodiment of the invention, the magnetic element can be a magnet or a loadstone, and the shaft is made of a magnetic conductive material.

To achieve the above objective, the present invention also discloses a fan including an impeller and a motor. The motor connects to the impeller for driving the impeller to rotate. The structure and its various aspects are illustrated hereinabove, so the detailed description thereof is omitted.

In one embodiment of the invention, the impeller includes a hub and a plurality of blades.

In one embodiment of the invention, the fan can be an axial-flow fan or a centrifugal fan.

As mentioned above, the fan and motor of the invention are configured with a magnetic element for magnetically interacting with the shaft, so that the shaft can be stably rotated.

When the motor operates in a constant rotation speed, this configuration allows the rotating motor to generate lower noise and vibration. Moreover, even when the motor operates in an accelerating rotation speed, this configuration can also prevent the exceeding noise and vibration. Consequently, the noise and vibration of the motor and the fan are reduced, so that the abrasion of the components is decreased so as to improve the application.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
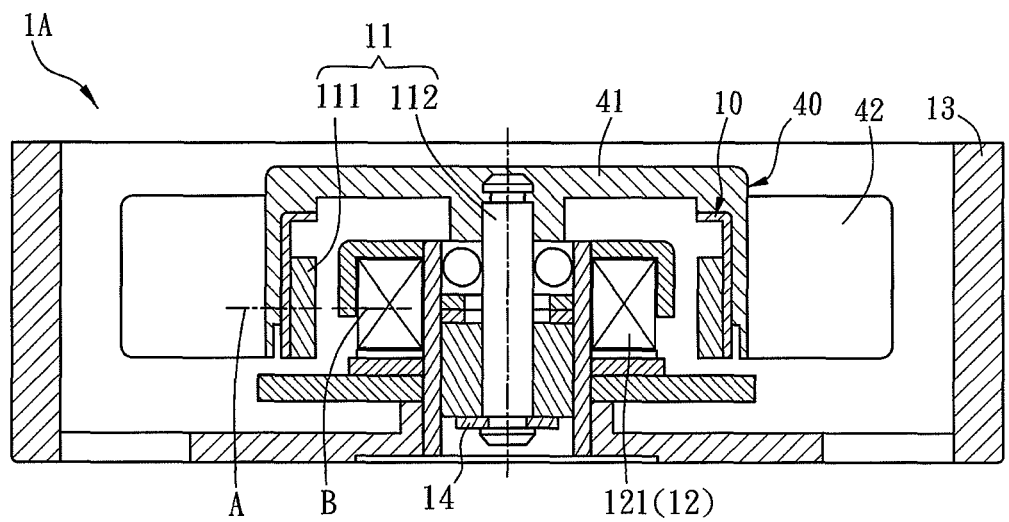
FIG. 1A is a schematic diagram showing a conventional fan and a motor thereof.
Figure 1B:
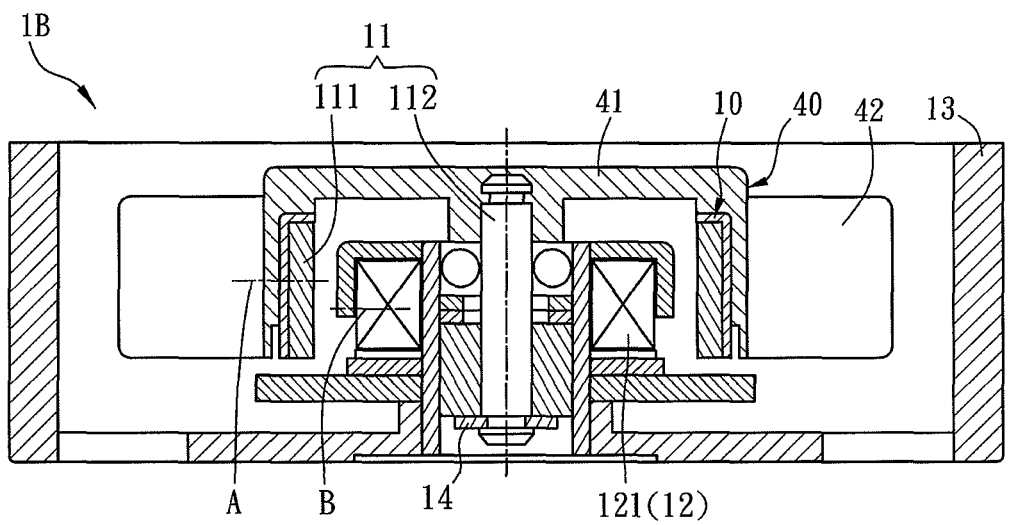
FIG. 1B is a schematic diagram showing another conventional fan and a motor thereof.
Figure 2:
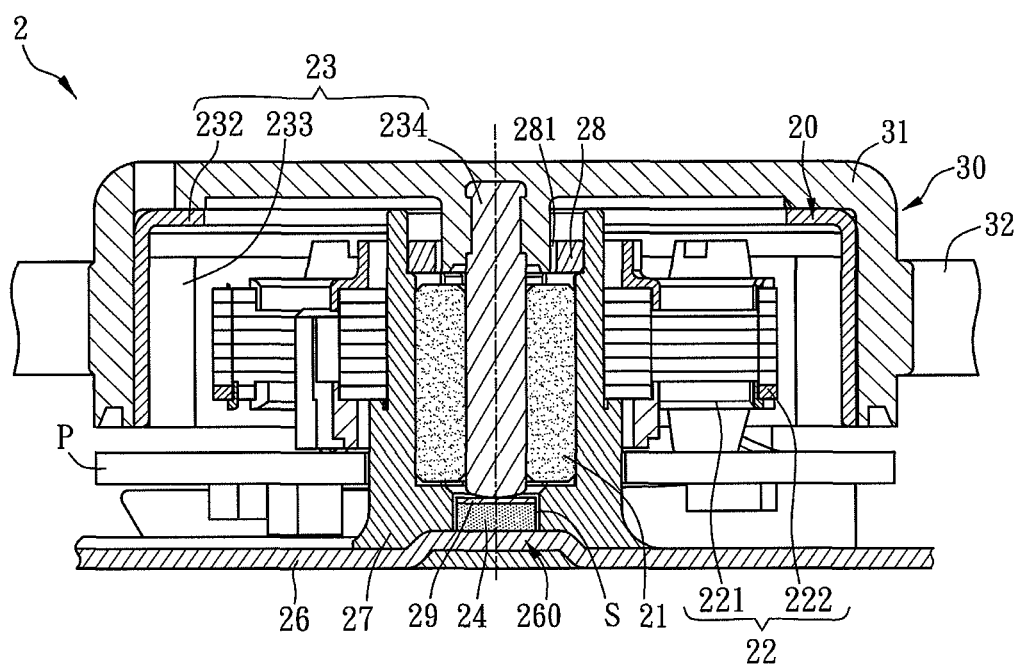
FIG. 2 is a schematic diagram showing a fan and a motor thereof according to an embodiment of the invention.
Figure 3A:
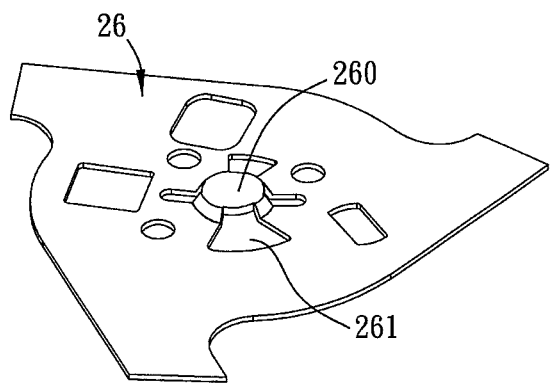
FIGS. 3A and 3B are schematic diagrams showing the base of the motor according to the embodiment of the invention, wherein the base has broken holes.
Figure 3B:
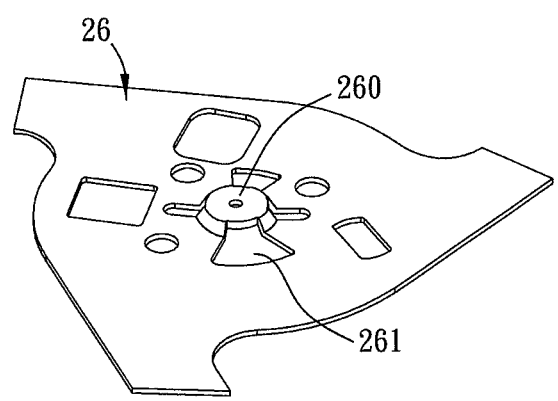
Figure 4A:
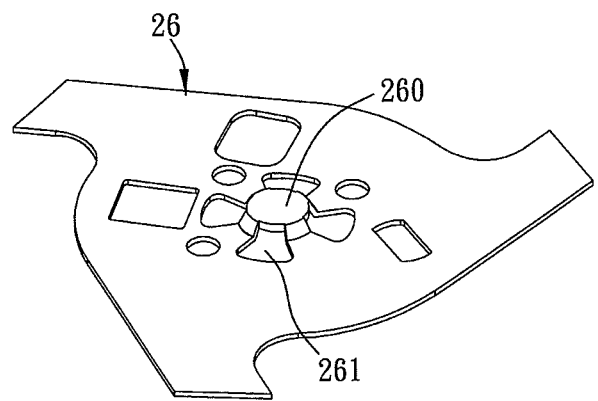
FIGS. 4A and 4B are schematic diagrams showing the base of the motor according to the embodiment of the invention, wherein the base has broken holes.
Figure 4B:
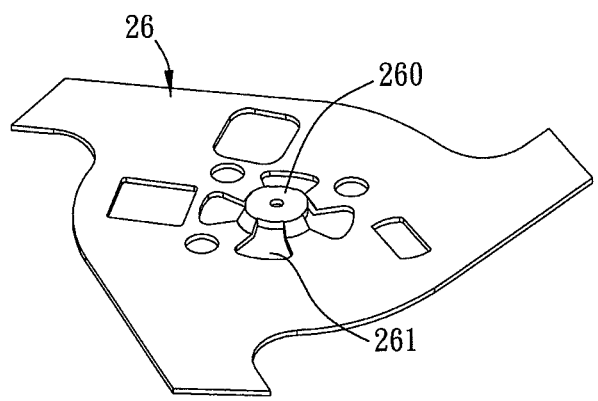
Figure 5A:
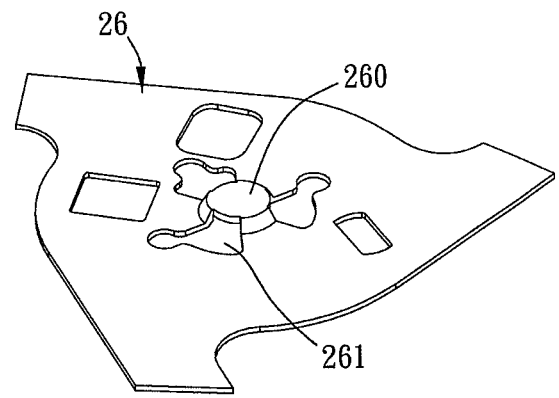
FIGS. 5A and 5B are schematic diagrams showing the base of the motor according to the embodiment of the invention, wherein the base has broken holes.
Figure 5B:
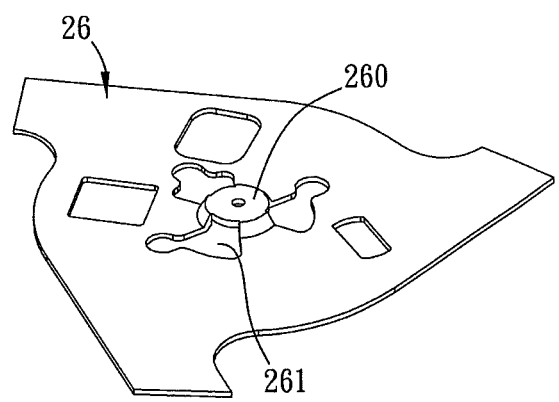

FIG. 2 is a schematic diagram showing a fan 2 and a motor 20 thereof according to an embodiment of the invention. Referring to FIG. 2, the fan 2 includes a motor 20 and an impeller 30. The motor 20 connects to the impeller 30 for driving the impeller 30 to rotate. The fan can be an axial-flow fan or a centrifugal fan. In the following embodiments, the fan is, for example but not limited to, the axial-flow fan. The impeller 30 includes a hub 31 and a plurality of blades 32. In details, the motor 20 connects to the hub 31. When the motor 20 drives the hub 31 to rotate, the rotating blades 32 can induce the airflow. Since the structure and operation of the fan composed of the motor and the impeller are the well-known technology for those skilled in the art, the detailed description thereof is omitted.

The motor 20 includes a base 26, a bushing 27, a bearing structure 21, a stator structure 22, a rotor structure 23 and a magnetic element 24. The bushing 27 is connected with the base 26. The bearing structure 21 is disposed in the bushing 27. The bushing 27 is threaded through the stator structure 22. The rotor structure 23 has a shaft 234, and the shaft 234 threads through the bearing structure 21. The shaft 234 is made of magnetic conductive material. Since the structure and operation of the motor are the well-known technology for those skilled in the art, the detailed description thereof is omitted.

If the bearing structure 21 is a sleeve bearing, the motor 20 further includes an oil-seal structure 28, which is disposed in the bushing 27 and is located adjacent to the top of the bearing structure 21. The shaft 234 passes through a through hole 281 of the oil-seal structure 28. The oil-seal structure 28 can prevent the lubricant of the bearing structure 21 (e.g. sleeve bearing) from leaking through the top opening of the bushing 27 while the motor 20 is operating, thereby maintaining the lubricating efficiency for the rotating shaft 234.

The base 26 includes a supporting platform 260, and the base 26 can be entirely made of the magnetic conductive material. The magnetic conductive material is, for example but not limited to, metal (e.g. iron) or alloy. For example, the base 26 is a metal base. Alternatively, for reducing the weight of the motor 20, only the supporting platform 260 of the base 26 is made of the magnetic conductive material, and the residual part of the base 26 is made of non-magnetic conductive material such as metal, alloy or rigid plastic. In practice, the base 26 can be made of a single metal, alloy or a combination of metal and plastic. No matter what the material of the base 26 is, the most important requirement is to use the magnetic conductive material to form the supporting platform 260. In the base 26, the range of the supporting platform 260 made of the magnetic conductive material corresponds to, for example but not limited to, the projection area of the bushing 27.

The magnetic element 24 corresponds to the shaft 234 and is disposed in an accommodating space S formed by the supporting platform 260 and the bushing 27. The magnetic element 24 is disposed on the supporting platform 260, and it is, for example, a magnet or a loadstone. Since the supporting platform 260 for supporting the magnetic element 24 is made of magnetic conductive material, the magnetic element 24 can attach to the supporting platform 260. Alternatively, the magnetic element 24 may be disposed on the supporting platform 260 by other mechanisms such as adhering, locking or screwing. The attaching mechanism is not limited in the invention. The size and shape of the magnetic element 24 can be optionally selected depending on the design and requirement of the actual motor. For example, the magnetic element 24 may be a solid or annular cylinder, and the diameter thereof may be equal to, slightly larger than or larger than the diameter of the shaft 234. In addition, since the size of the magnetic element 24 is determined according to the design and requirement of the motor 20, the magnetic force is in reverse proportion to the square of the distance, the magnetic element 24 and the circuit board P are separated from each other, and the magnetic element 24 is disposed on the supporting platform 260 with magnetic conductive ability, the magnetic loop generated by the magnetic element 24 can not affect the normal operations of the electronic components on the circuit board P.

The magnetic element 24, the supporting platform 260 made of the magnetic conductive material, and the shaft 234 made of the magnetic conductive material together form a magnetic loop. The magnetic loop magnetically interacts with the shaft 234, so that the rotation of the shaft 234 is more stable and smooth, thereby reducing the noise and vibration. When the motor operates in a constant rotation speed, this configuration allows the rotating motor to generate lower noise and vibration. Moreover, even when the motor operates in an accelerating rotation speed, this configuration can also prevent the exceeding noise and vibration. In addition, a washer 29 may be disposed between the bottom of the shaft 234 and the magnetic element 24, so that the rotation of the shaft 234 is much more stable and smooth, thereby reducing the abrasion of the shaft 234.

The material of the bushing 27 may be different from that of the base 26 or the supporting platform 260, and it may be, for example but not limited to, plastic. In practice, the bushing 27 is connected with the base 26 by insert molding. In details, the base 26 is placed in a mold, and then the plastic material is injected into the mold by injection molding. Accordingly, when the bushing 27 is formed by injection molding, it can simultaneously connect to the supporting platform 260 of the base 26. This process can make the base 26 and the bushing 27 to be integrally formed as a single piece, so that the connection strength between different materials can be increased. As shown in FIG. 2, the plastic material of the bushing 27 can be injected to cover the bottom of the supporting platform 260 so as to further increase the connection strength. In this embodiment, the plastic material may be a thermoplastic, thermosetting or light-curing plastic material.

Besides, referring to FIGS. 3A to 5B, the base 26 may further include at least one broken hole (through hole) 261. In the following aspects, the base 26 includes, for example but not limited to, a plurality of broken holes 261. The broken holes 261 can be arranged in symmetric or asymmetric, and the shapes and/or sizes of the broken holes 261 may be the same or different. The center of the supporting platform 260 corresponding to the magnetic element 24 may be configured with the broken holes 261 (see FIGS. 3B, 4B and 5B) or without the broken holes 261 (see FIGS. 3A, 4A and 5A). In the injection molding process, the material for forming the bushing 27 (e.g. plastic material) covers the broken holes 261 and the bottom of the base 26 adjacent to the broken holes 261. This can increase the contact area between different materials and further improve the connection strength. To be noted, although these aspects use the broken holes for example, it is also possible to use blind holes (not shown) to replace the broken holes. In the injection molding process, the material for forming the bushing 27 (e.g. plastic material) also fills the blind holes, and the connection strength can be increased too.

The bushing 27 threads through the stator structure 22. The stator structure 22 includes coils 221 and magnetic pole slices 222, and the coils 221 wind around the magnetic pole slices 222. The magnetic pole slices 222 are, for example, silicon steel slices. The rotor structure 23 includes a metal shell 232, a magnet 233, and a shaft 234. The magnet 233 is annularly disposed on the inner side of the metal shell 232, and it is positioned corresponding to the coils 221 and the magnetic pole slices 222, which form the stator structure 22.

As mentioned above, when the motor 20 is started, the current flows through the coils 221 of the stator structure 22 to generate a magnetic field and magnetize the magnetic pole slices 222, which applies the magnetic force to the magnet 233 of the rotor structure 23, thereby pushing the rotor structure 23 to rotate. In this embodiment, since the magnetic element 24 magnetically interacts with the shaft 234, the shaft 234 of the rotor structure 23 can rotate more stable. Thus, the vibration and noise are decreased, and the abrasion of the components is also reduced.

To be noted, since the magnetic element 24 is disposed in the accommodating space S formed by the base 26 and the bushing 27, the horizontal position of the magnetic element 24 can be fixed through the bushing 27, and the vertical position thereof can be fixed by the magnetic force of the base 26. Thus, the position of the magnetic element 24 can be fixed without additional fixing elements, so that the entire design of the motor 20 can be simplified.

Figure 6A:
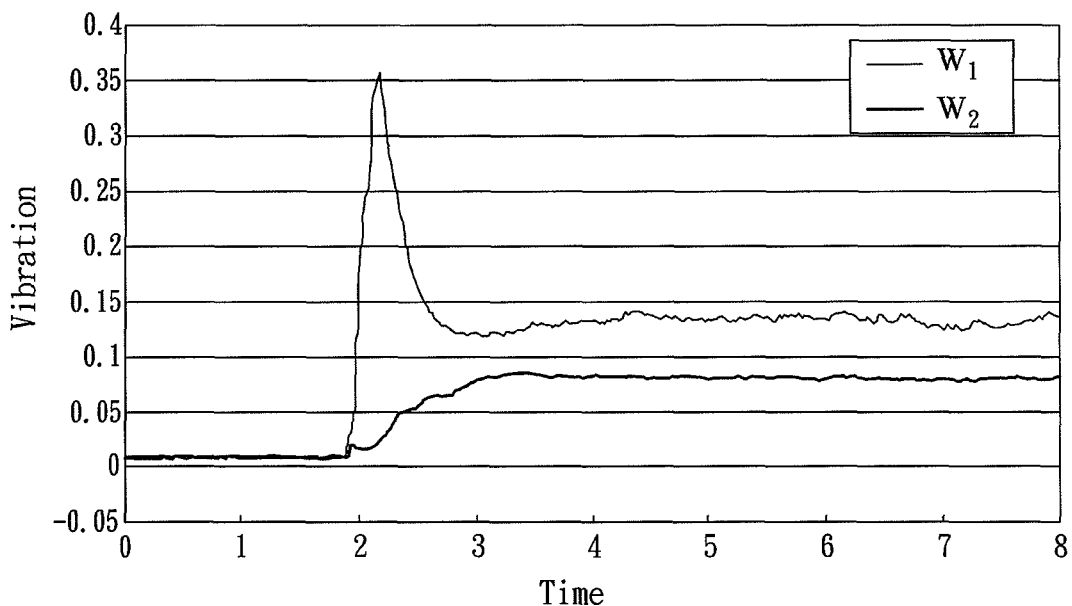
FIGS. 6A and 6B are schematic graphs showing the measuring results of the vibrations for the conventional fan and the fan according to the embodiment of the invention.
Figure 6B:
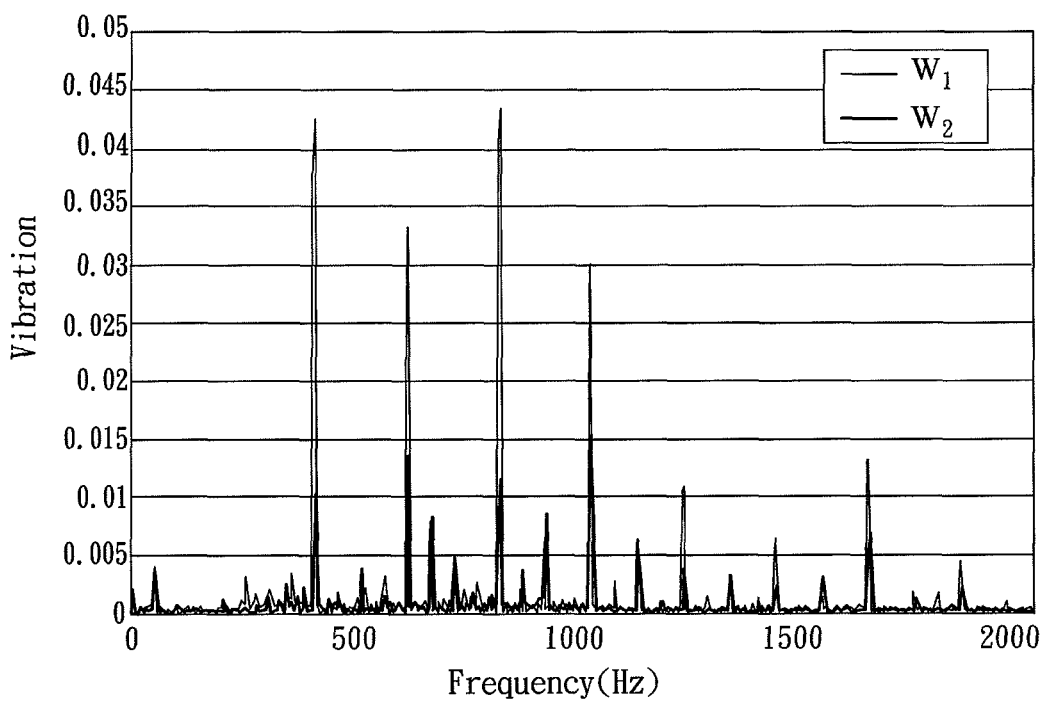

FIGS. 6A and 6B are schematic graphs showing the measuring results of the vibrations for the fan 2 (with the magnetic element 24) and the conventional fan 1A (without the magnetic element) at the fan start instant and the constant rotation speed. As shown in FIG. 6A, the waveform $W_1$ represents the vibration of the fan 1A at the fan start instant, and the waveform $W_2$ represents the vibration of the fan 2 at the fan start instant. Comparing the waveforms $W_1$ and $W_2$, the amplitude of the waveform $W_1$ is larger than that of the waveform $W_2$, and the maximum peak of the waveform $W_1$ is sufficiently larger than that of the waveform $W_2$. As shown in FIG. 6B, the waveform $W_1$ represents the vibration of the fan 1A operated at a constant rotation speed, and the waveform $W_2$ represents the vibration of the fan 2 operated at a constant rotation speed. Comparing the waveforms $W_1$ and $W_2$, the amplitude of the waveform $W_1$ is still larger than that of the waveform $W_2$. As a result, comparing with the conventional fan 1A, the fan 2 can provide the vibration waveform $W_2$ more stable than the vibration waveform $W_1$ of the fan 1A at both the fan start instant and the constant rotation speed. In other words, the fan 2 of the invention can effectively reduce the vibration and noise.

Figure 7:
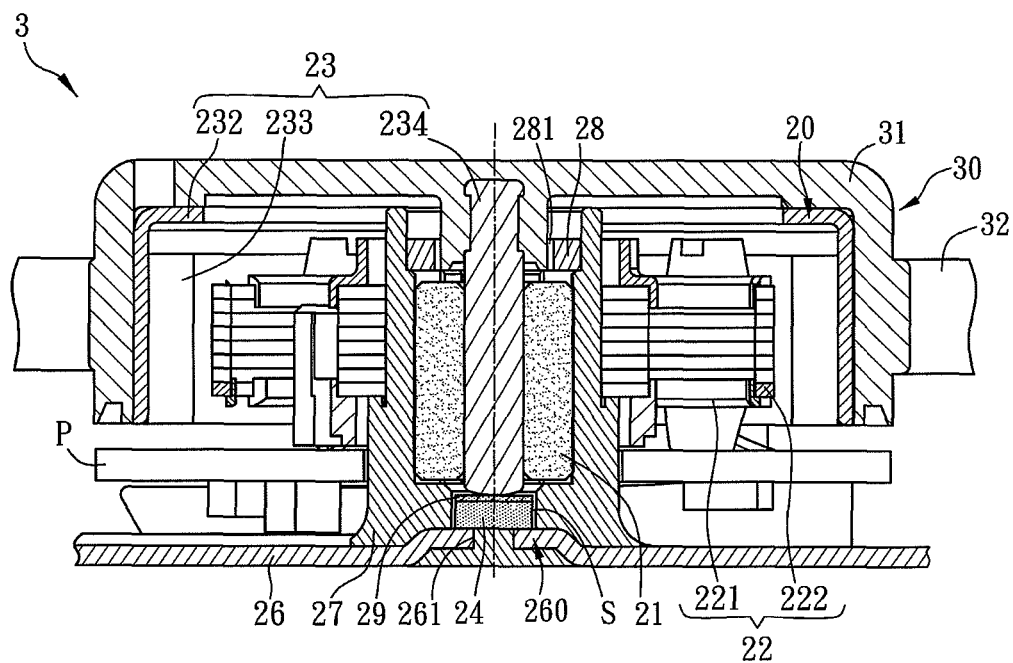
FIGS. 7 to 9 are schematic diagrams showing various aspects of the fan and motor according to the embodiment of the invention.
Figure 8:
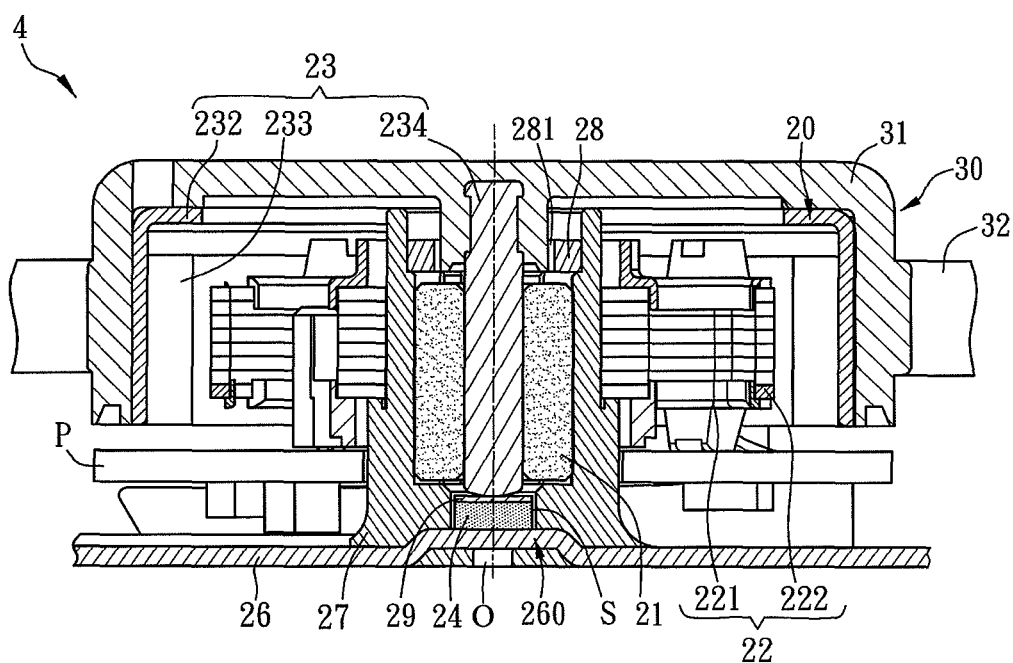
Figure 9:
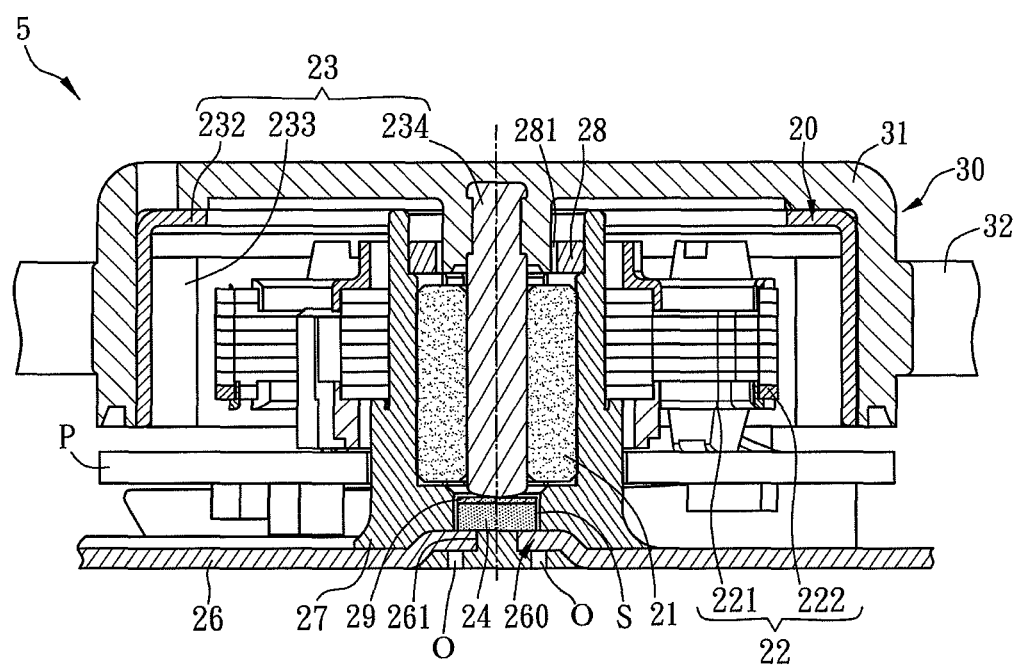

FIGS. 7 to 9 are schematic diagrams showing various aspects of the fan and motor according to the embodiment of the invention. As shown in FIG. 7, a fan 3 is different from the previous fan 2 in that the supporting platform of the fan 3 includes a broken hole 261. In the fan 3, the material for forming the bushing 27 (e.g. plastic) covers the broken hole 261 and the bottom of the base 26 adjacent to the broken hole 261. Accordingly, the contact area between different materials can be increased so as to enhance the connection strength. Therefore, the leakage of the lubricant in the fan 3 can be prevented.

As shown in FIG. 8, a fan 4 is different from the previous fan 2 in that the base 26 does not include any broken hole. In addition, at least one through hole O is formed while using the material (e.g. plastic) to cover the bottom of the base 26 during the injection molding process for forming the bushing 27 of the fan 4. Of course, it is possible to perform injection molding process without forming the through hole O. Since the supporting platform 260 of the fan 4 does not have the broken hole, the configuration of the through hole O can reduce the manufacturing cost of the plastic material while the structure is stable and the lubricant is not leaked. In addition, the configuration of the through hole O can provide the holding portion for the holding chuck (not shown), so that the manufacturing processes for the fan 4 can be easily performed. Of course, it is also possible to perform injection molding process for forming the bushing 27 with configuring a plurality of through holes O.

As shown in FIG. 9, a fan 5 is different from the previous fan 2 in that the supporting platform 260 of the fan 5 includes a broken hole 261, and two through holes O are formed during the injection molding process for forming the bushing 27. Of course, it is possible to perform injection molding process without forming the through hole O. In this case, the broken hole 261 and the through holes O are misaligned, so that the leakage of the lubricant in the fan 5 can be prevented.

In summary, the fan and motor of the invention are configured with a magnetic element for magnetically interacting with the shaft, so that the shaft can be stably rotated. When the motor operates in a constant rotation speed, this configuration allows the rotating motor to generate lower noise and vibration. Moreover, even when the motor operates in an accelerating rotation speed, this configuration can also prevent the exceeding noise and vibration. Consequently, the noise and vibration of the motor and the fan are reduced, so that the abrasion of the components is decreased so as to improve the application.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor comprising:
   a base having a supporting platform;
   a bushing connected with the base;
   a bearing structure disposed in the bushing;
   a rotor structure having a shaft, wherein the shaft threads through the bearing structure; and
   a magnetic element corresponding to the shaft and disposed on the supporting platform, wherein the magnetic element magnetically interacts with the shaft,
   wherein the base or the supporting platform is made of a magnetic conductive material, and the magnetic element attaches to the supporting platform,
   wherein the base and the bushing are integrally formed as a single piece, and the bushing is connected with the supporting platform of the base by insert molding, and the base and the bushing are made of different materials,
   wherein the base has at least one through hole or a blind hole, and the material of the bushing covers the through hole or the blind hole, and the supporting platform is part of the base.

2. The motor according to claim 1, wherein the bearing structure is a sleeve bearing.

3. The motor according to claim 2, further comprising:
   an oil-seal structure disposed in the bushing and located adjacent to the top of the bearing structure, wherein the oil-seal structure has a through hole, and the shaft passes through the through hole.

4. The motor according to claim 1, wherein the magnetic element is a magnet or a loadstone, and the shaft is made of a magnetic conductive material.

5. The motor according to claim 1, further comprising a stator structure, wherein the bushing is threaded through the stator structure.

6. A fan comprising:
   an impeller; and
   a motor connecting to the impeller for driving the impeller to rotate, wherein the motor comprises a base having a supporting platform, a bushing connected with the base, a bearing structure disposed in the bushing, a rotor structure having a shaft, and a magnetic element corresponding to the shaft and disposed on the supporting platform, wherein the shaft threads through the bearing structure, and the magnetic element magnetically interacts with the shaft,
   wherein the base or the supporting platform is made of a magnetic conductive material, and the magnetic element attaches to the supporting platform,
   wherein the base and the bushing are integrally formed as a single piece, and the bushing is connected with the supporting platform of the base by insert molding, and the base and the bushing are made of different materials,
   wherein the base has at least one through hole or a blind hole, and the material of the bushing covers the through hole or the blind hole, and the supporting platform is part of the base.

7. The fan according to claim 6, wherein the bearing structure is a sleeve bearing and comprising:
   an oil-seal structure disposed in the bushing and located adjacent to the top of the bearing structure, wherein the oil-seal structure has a through hole, and the shaft passes through the through hole.

* * * * *